United States Patent
Miles et al.

[11] 3,868,173
[45] Feb. 25, 1975

[54] OBJECTIVE LENS ASSEMBLY FOR PROJECTION TELEVISION

[75] Inventors: John R. Miles; Grant M. Miles, both of Glenview, Ill.

[73] Assignees: Maris Ambatis; Thomas D. Shannon; Walter J. DeMaria, New York, N.Y.

[22] Filed: Jan. 18, 1973

[21] Appl. No.: 324,845

[52] U.S. Cl........... 350/215, 350/175 NG, 350/189, 350/255
[51] Int. Cl. ............................................. G02b 9/60
[58] Field of Search...... 350/215, 216, 224, 175 FS, 350/175 NG

[56] References Cited
UNITED STATES PATENTS

| | | | |
|---|---|---|---|
| 2,649,021 | 8/1953 | Angenieux | 350/224 |
| 3,429,997 | 2/1969 | Rosner et al. | 350/224 X |
| 3,516,735 | 6/1970 | Goodell | 350/224 X |
| 3,800,085 | 3/1974 | Ambats et al. | 350/175 NG X |

FOREIGN PATENTS OR APPLICATIONS 593,514   10/1947   Great Britain ..................... 350/224

Primary Examiner—John K. Corbin

[57] ABSTRACT

A high-speed objective lens assembly for projecting the image appearing on a television display tube onto a remote screen or for like purposes. The lens assembly is constituted by a group of four lenses constituting the main part of the objective, the fifth lens taking the form of a field flattener adapted to cooperate with the curved screen of the display tube. The aperture ratio is substantially 1: 1.5 and the maximum angle of field is at least ± 20 degrees.

6 Claims, 4 Drawing Figures

3,868,173
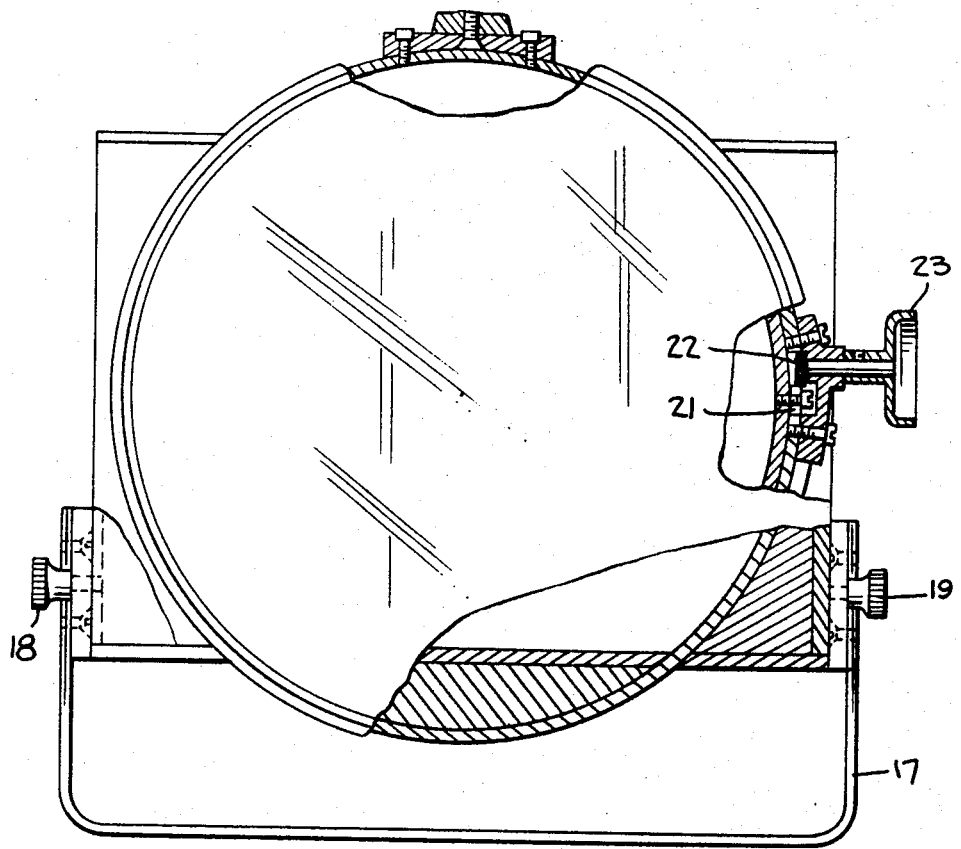
Fig.2.
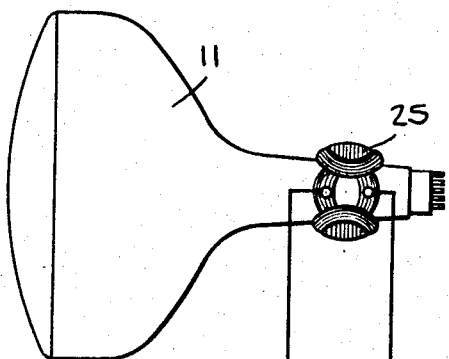
Fig.4.
Fig.3.
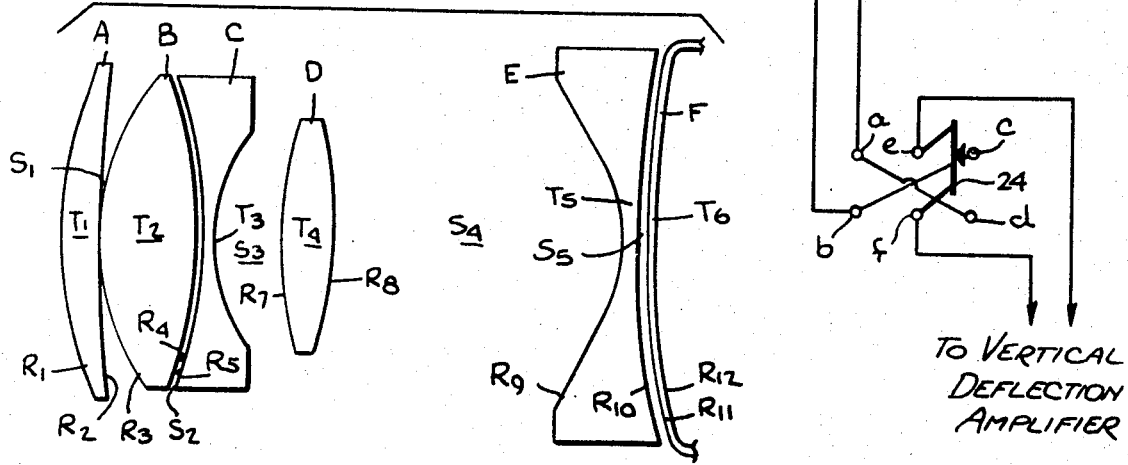

OBJECTIVE LENS ASSEMBLY FOR PROJECTION TELEVISION

RELATED APPLICATION

This application is related to the copending application of Maris Ambats, Thomas D. Shannon and Walter J. de Maria, entitled "Convertible Direct Viewing/Projection T-V System," Ser. No. 299,197, filed Oct. 20, 1972 now U.S. Pat. No. 3,800,085.

BACKGROUND OF INVENTION

This invention relates generally to optical projection lens systems, and more particularly to an objective lens assembly for enlarging the image appearing on the screen.

In order to produce an image on a screen which is seemingly life-size, the dimensions of the screen whether for motion-picture or T-V presentation, must be properly related to the scope of the viewing area. In general, the larger the viewing area, the greater are the screen dimensions necessary to create a realistic picture. Thus, in a large motion picture theatre having hundreds of seats, it is customary to use a giant size screen occupying almost the entire frontal area of the theatre. When an observer in a theatre of this type is seated 2 or 3 hundred feet from the screen, a human figure displayed on the screen will seem to have realistic proportions only if the image thereof is several times its normal scale.

On the other hand, should the screen be placed in a living room for a home movie presentation, the screen in this instance need be no greater than that necessary to produce images approaching the normal scale, for a viewer is then but a few feet from the screen. Thus for home movie purposes a screen whose dimensions are 2.5 by 3.3 feet will afford images in an acceptable scale and the picture will be presentable if the image brightness is about three foot lamberts. But to see a good picture at this light level, it must be viewed in near darkness.

Where a proper visual relationship does not exist because the screen is oversize or too small with respect to the viewing area, the resultant images, as seen by the viewer, appear to be incongruous and violate his sense of scale. Moreover, an improper relationship between screen size and the viewer's distance therefrom is psychologically disturbing and give rise to visual fatigue.

This imbalance between screen size and the viewer's position relative to the screen is particularly acute in home T-V presentations in which a luminous image is formed on the phosphorescent screen of a relatively small cathode ray tube. Most homes in the United States have T-V sets with a 17 inch screen (as measured diagonally). Sets with 23 and 25 inch screens are also available. And while these sizes represent a marked improvement over the 9 to 12 inch screens that were prevalent in the early days of television, the currently available T-V screen range still falls far short of the dimensions necessary for optimum viewing comfort and enjoyment.

Larger cathode ray tubes dictate more commodious cabinets or consoles and entail higher-powered electronic circuits capable of driving the tube. Practical considerations impose strict constraints on the maximum size of a T-V tube that is feasible for home use. It is unlikely that tube sizes can be expanded beyond their present limits. This fact has been recognized for many years and it is for this reason that attempts have been made to employ optical projection systems in conjunction with T-V viewers in order to cast an enlarged image on a home screen of suitable size.

One factor which accounts for the high cost of existing types of T-V projection systems is light intensity. A standard T-V set having a relatively small screen has sufficient light intensity to make viewing possible in a room having a fairly high level of ambient light. But should the image on the small T-V screen projected onto a remote screen by a conventional optical system, the light losses encountered in optical projection are such as to produce an unacceptably dim image on the screen, even in near darkness.

It therefore becomes necessary to provide special electronic circuits operating in conjunction with a high-intensity cathode-ray tube, to step up the brightness on the screen beyond its normal level to compensate for these optical losses. Thus, the conventional T-V set cannot be used in conjunction with the projector, and since special circuits and tubes are necessary, this adds substantially to the cost of the system.

Another approach which has recently been taken is to produce a bright 6-foot wide color picture which is twelve times the size of the biggest (25 inch) direct view T-V set presently being made. However, this approach requires that the conventional color T-V be abandoned in favor of three special projection tubes, one for each primary color. The three color images are projected separately onto the screen where they combine for the full color image. The cost of this arrangement is, for obvious reasons, much greater than that of a standard T-V receiver.

Another factor which precludes the use of a simple, inexpensive optical system for T-V projection is image reversal, for when an ordinary lens is placed before a T-V cathode ray screen for direct projection, the system forms an inverted image which is seen on the remote screen upside down and reversed from left to right.

It is known in optics to use an erecting system to reinvert the image produced by the lens to its proper orientation. This erecting system may be a lens or a prism arrangement, such as the "Porro" system consisting of two right angle prisms oriented at 90° to each other, the first prism reversing the image from top to bottom and the second prism from left to right. But erecting systems complicate the projection lens assembly and add substantially to the cost thereof. Moreover, erecting systems introduce further light losses.

In the above-identified co-pending patent application of Ambats et al., there is disclosed a converter fir a standard T-V set, the converter being constituted by a direct-throw optical projection system functioning in conjunction with an inverting switch which, when the optical system is operative, acts to invert the image on the cathode ray screen and to reverse it left to right, whereby the image on the remote screen is then properly oriented, thereby doing away with the need for optical erecting elements and simplifying the projecting system.

Because such a converter is capable of inexpensively transforming a living room or other small chamber having a standard T-V receiver into a video theatre, the converter brings new life to the home entertainment, education and commercial fields. Thus, T-V programs, such as sports events and movies and educational films which have limited effectiveness when seen on a small T-V screen may now be viewed in proper scale on a large screen.

SUMMARY OF INVENTION

In view of the foregoing, it is the main object of this invention to provide a high-speed objective lens assembly which covers a substantial field of view and which is usable for direct-throw projection of television images or for comparable projection purposes. While the invention will be described in conjunction with the projection of T-V images, it will be appreciated that the lens assembly is usable in many other applications requiring image enlargement.

More particularly, it is an object of this invention to provide an objective lens assembly of the abovetype which is adapted to operate with a field of view that is outwardly curved, as in the case of a television cathode ray display screen.

Still another object of the invention is to provide a low-cost objective lens assembly, all of whose elements are molded, cast, or otherwise fabricated in final form of plastic material having a high order of light permeability.

A significant advantage of a plastic lens assembly in accordance with the invention over a glass lens assembly having an equivalent focal length and speed is that the plastic lens system would not only be light for its size and much less costly to fabricate, but it would also produce brighter images. A glass objective would be relatively thick, and because the light transmission characteristics of glass are inferior to such plastics as transparent acrylic, the resultant images would be dimmer than those produced by an optically equivalent plastic lens system.

Briefly stated, in one preferred embodiment of the invention, a high-speed objective lens assembly is provided, the assembly having a substantial field of view, with a speed of at least f: 1.5 and a field of view of at least ± 20°. The assembly is constituted by a first lens element of positive power of refraction, a second lens element of positive power of refraction, a third lens element of negative power of refraction, a fourth lens element of positive power of refraction, and a fifth lens element of negative power of refraction.

The fifth element is adapted to serve as a field flattener so that the assembly is capable of functioning with cathode ray tubes having a curved faceplate in which the image is defined on the inner phosphorescent surface of the screen while the field flattener is disposed adjacent the outer surface of the screen. The same assembly, with a slight modification of the fifth element, can be made to function effectively with a flat field.

OUTLINE OF THE DRAWINGS

For a better understanding of the invention as well as other objects and further features thereof, reference is made to the following detailed description to be read in conjunction with the accompanying drawings, wherein:

FIG. 2 is a front view of the accessory, partly in section;

Figure 1:
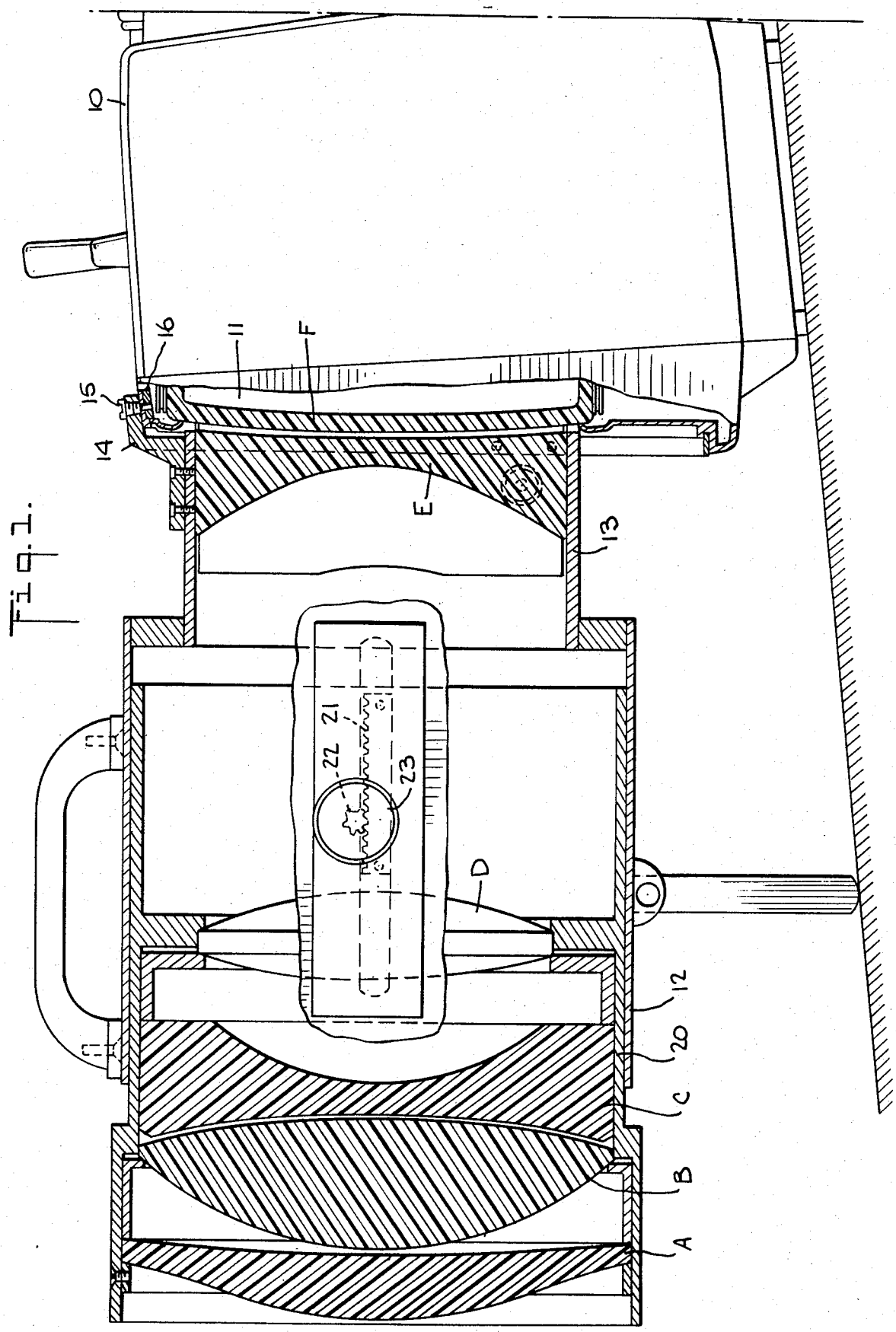
FIG. 1 is a longitudinal section taken through one preferred embodiment of an optical accessory whose objective lens assembly is in accordance with the invention, the accessory being attachable to a standard T-V set.

FIG. 3 schematically illustrates the lenses included in the accessory; and

FIG. 4 shows the inverter switch connections to the T-V set.

DESCRIPTION OF INVENTION

Referring now to FIG. 1, there is shown a standard T-V receiver, generally designated by numeral 10, and provided with a cathode-ray display tube 11. In the conventional T-V system, a T-V camera tube employes an electron scanning beam to read off variations of signal amplitude corresponding to brightness from a photo-sensitive surface upon which a picture image is focused. This image is recreated by a cathode-ray display tube when a corresponding, synchronously modulated and deflected electron beam impinges on the rectangular raster area on the phosphorescent screen surface of the tube.

Because the beam originates from a point source, in order to avoid distortion it is essential that the face of the tube be outwardly curved so that the beam traces an arcuate path.

Hence when the cathode ray tube is directly viewed, the luminous image is seen on an outwardly curved surface, but since the curvature is gentle, this is not disturbing to the viewer. But when the curved field is optically enlarged onto a flat viewing screen, the curvature becomes more pronounced and is disturbing to the viewer, unless corrected. An optical projection in accordance with the invention takes this curvature into account.

The converter includes an optical accessory in accordance with the invention which is attachable to the front face of the T-V receiver and is provided with a housing having a cylindrical front section 12 which is joined to a rectangular rear section 13. Rear section 13 is dimensioned to mask the transparent front face F of the cathoderay tube 11 so that all light emitted therefrom is confined to the accessory when the accessory is attached to the set.

For purposes of ready attachment and removal, the rear section 13 is provided with a top bracket 14 having a retractable pin 15 which is adapted to enter a socket 16 installed at the center of the top wall of the T-V receiver cabinet. The front section is provided with a U-shaped or telescoping stand 17 which is pivoted thereto so that the stand may be angled to rest on a supporting surface and the set and accessory may be inclined to shoot an image at a desired angle. The stand position is maintained by knoboperated set-screws 18 and 19. In practice, side screws (not shown) may also be provided to anchor the accessory more firmly onto the T-V set. The invention, however, is not limited to any one means for coupling the optical accessory to the set.

The optical objective is constituted by five lens elements A, B, C, D, and E, in the order listed from front to rear. Lens elements A, B, C and D form a lens assembly that is mounted at spaced positions within a barrel 20 which telescopes within front section 12 and is axially slidable therein to effect focusing.

The axial position of the lens assembly is adjusted by means of a rack 21 secured to the side of the barrel and extending longitudinally. Rack 21 is engaged by a pinion 22 operated by an external control knob 23. Thus by turning the knob the barrel moves in or out, depending on the direction of rotation. In this way the image projected onto a remote screen may be focused for different distances and screen dimensions. This feature is useful, for in some instances the T-V set may be placed in a small room, in which case the projection throw is necessarily short and in other instances, the available space for a larger screen may be much greater.

Lens A is the first lens element, and it has a convex front surface with a vertex radius of curvature of $R_1$ and a concave rear surface with a radius of curvature of $R_2$. The axial thickness of the first lens element is $T_1$. The axial air space between the first lens element and the second lens element is $S_1$.

Lens B is the second lens element, and it has a convex front surface with a radius of curvature of $R_3$ and a convex rear surface with a radius of curvature of $R_4$. The axial thickness of the second lens element is $T_2$. The axial space between the second and third lens elements is $S_2$.

Lens C is the third lens element and it has a concave front surface with a radius of curvature of $R_5$ and a concave rear surface with a vertex radius of curvature of $R_6$. The axial thickness of the third lens element is $T_3$. The axial air space between the third lens element and the fourth lens element is $S_3$.

transparent face. Element F has a convex front surface with a radius of curvature of $R_{11}$, and a concave rear surface with a radius of curvature of $R_{12}$.

The front surface of lens element A, the rear surface of element C and the front surface of lens element E have aspheric surfaces, and the data for formulation of the said aspheric surfaces is included in the data table for the lens shown below.

By way of example, the numerical data of a preferred embodiment of the invention are stated in the following table. The numerical data are stated with reference to a mean focal length of $F = 10.0$.

The first column of the table indicates the lens means A to E and the tube face F. The second column states numerical values for the radii of curvatures $R_1$ to $R_{12}$. The third column states numerical values for the axial separation of the surfaces. The fourth column contains the numerical values for the indexes $N_D$ of refraction of materials used for the lenses for the D line of the spectrum. The fifth column states the numerical values of the Abbe dispersion numbers $V_D$.

The aperture ratio of the objective is 1:1.5 and the back focal length is substantially zero as the image is located at the rear surface of the transparent face of the cathode ray tube or the like.

|   |   | R |   | SPACES | $N_D$ | $V_D$ |
|---|---|---|---|---|---|---|
| A | $R_1$ | = | 8.741 | | | |
|   |   |   |   | $T_1$ = 1.089 | 1.489 | 54.3 |
|   | $R_2$ | = | 50.81 | | | |
|   |   |   |   | $S_1$ = .01 | | |
| B | $R_3$ | = | 6.204 | | | |
|   |   |   |   | $T_2$ = 2.468 | 1.489 | 54.3 |
|   | $R_4$ | = | −16.34 | | | |
|   |   |   |   | $S_2$ = .001 | | |
| C | $R_5$ | = | −17.75 | | | |
|   |   |   |   | $T_3$ = .529 | 1.5917 | 30.8 |
|   | $R_6$ | = | 4.491 | | | |
|   |   |   |   | $S_3$ = 1.849 | | |
| D | $R_7$ | = | 12.90 | | | |
|   |   |   |   | $T_4$ = 1.458 | 1.489 | 54.3 |
|   | $R_8$ | = | −8.03 | | | |
|   |   |   |   | $S_4$ = 7.724 | | |
| E | $R_9$ | = | −3.141 | | | |
|   |   |   |   | $T_5$ = .5 | 1.489 | 54.3 |
|   | $R_{10}$ | = | 40.1 | $S_5$ = .1 | | |
| F | $R_{11}$ | = | 40. | | | |
|   |   |   |   | $T_6$ = .3 | 1.507 | 46.9 |
|   | $R_{12}$ | = | 32.3 | | | |

Lens D is the fourth lens element, and it has a convex front surface with a radius of curvature of $R_7$ and a convex rear surface with a radius of curvature of $R_8$. The axial thickness of the fourth lens element is $T_4$. The axial air space between the fourth lens element and the fifth lens element is $S_4$.

Lens E, which is fixedly supported in the rear section 13 against the face F of the cathode ray tube, is the fifth lens element and it has a concave front surface with a vertex radius of curvature of $R_9$ and a concave rear surface with a radius of curvature of $R_{10}$. The axial thickness of the fifth element is $T_5$ and the axial air space between the fifth lens element and the front surface of the cathode ray tube front face is $S_5$.

Element F is the front transparent face of a cathode ray tube which is not part of the invention, but the particular embodiment of the invention has its image field curvature adjusted to fit the rear surface of said front Space $S_4$ is a variable space between the axially shiftable lens assembly A, B, C and D and fixed lens E to focus the lens assembly for various distances to the left-hand image (or object) position. As given, the lens is focused for approximately a 108 unit distance to the first image (or object) and a magnification of −0.125.

$R_1$, $R_6$ and $R_9$ are vertex radii of curvature, as these three surfaces are aspheric, and the radius of curvature varies for different parts of the surface.

The shapes of these three surfaces are defined by the formula:

$$Z = C \cdot Y^2 / 1 + \sqrt{1-(K+1) \cdot C^2 \cdot Y^2} + dY^4 + eY^6 + fY^8 + gY^{10}$$

The numerical values for insertion into the above formula for calculating values of Z for each value of Y are found in the following tables for each of the lens surfaces, 1, 6 and 9.

| Surface $R_1$ | | Surface $R_8$ | | Surface $R_9$ | |
|---|---|---|---|---|---|
| c | .1144 | | .22268 | — | .31835 |
| K | — .57011 | — | .12298 × $10^{-1}$ | — | .15979 × 10 |
| d | — .39510 × $10^{-3}$ | — | .41923 × $10^{-3}$ | | .31413 × $10^{-2}$ |
| e | — .56167 × $10^{-5}$ | — | .16911 × $10^{-4}$ | — | .67540 × $10^{-4}$ |
| f | .17766 × $10^{-6}$ | — | .34771 × $10^{-5}$ | — | .24771 × $10^{-5}$ |
| g | — .19389 × $10^{-7}$ | — | .19956 × $10^{-7}$ | | .10339 × $10^{-6}$ |

It has been found that an objective lens according to the above tables has good contrast and high resolution over its entire field of view of ± 20°. The objective lens is corrected for all optical errors over the entire field of view of ± 20°, and it is evident that objective lenses which do not have exactly the same numerical data as stated in the above tables will be sufficiently corrected to obtain the high quality of the objective lens according to the invention, and still lie within the scope of the present invention.

Lens elements A, B, C, D and E are made of a plastic material having suitable optical properties, such as transparent acrylic or polystyrene. Among the advantages of optical plastic over glass are light weight, low cost and a high order of light permeability. For example, in one actual embodiment, the focal length of the objective is substantially 10 inches. A glass objective of this focal length would be so thick that the light transmission would be low due to the higher absorption of glass.

Three of the lens surfaces are aspheric in order to obtain the speed required (at least $f : 1.5$) in this objective. These surfaces are numbered 1, 6 and 9. The lenses may be molded or cast in final form for use. The objective has a substantial field of view (at least ± 20°). Lenses A and B have a positive power of refraction, lens C has a negative power of refraction, lens D has a positive power of refraction and lens E has a negative power of refraction.

Referring now to FIG. 4, there is shown the second component of the converter, namely inverter switch 24 which is a double-pole double-throw switch having two pairs of fixed contacts a–b and c–d, and having one pair of movable contacts e–f. The switch is interposed in the vertical deflection circuit of cathode ray tube 11 which includes a vertical deflection yoke 25. Movable contacts e–f are connected to the vertical deflection amplifier of the set which in the absence of the switch is ordinarily connected directly to the vertical deflection yoke.

The yoke is connected to fixed contact pair a–b which is cross-connected to fixed contact pair c–d. Thus when movable contacts e–f engage fixed contacts a–b, the vertical deflection amplifier is connected to the yoke in the usual manner, but when the movable contacts engage fixed contacts c–d, the connections are reversed.

Thus the switch when engaging contacts c–d acts to invert the T-V raster, causing the image on the tube to be inverted and reversed left to right. With the image inverted and reversed left to right in this manner, no need exists to provide erecting elements in the optical accessory and direct projection becomes possible, with the resultant image on the remote screen properly oriented.

When the accessory is detached from the T-V set, the inverting switch is manually positioned on fixed contacts a–b for normal direct viewing of the cathode ray screen, but when the accessory is in place, the switch is positioned on fixed contacts c–d for viewing on the remote screen. In practice the switch may be provided with a projecting actuator pin which is engaged when the accessory is mounted in place and disengaged when the accessory is removed to provide an automatic switching action. All that need be done to install the inverter switch in a standard T-V set is to cut the existing wires from the vertical deflection amplifier to the vertical deflection yoke and make the connections shown in FIG. 4. This does not affect the set or picture tube adjustment in either black and white or color.

In the five lens objective shown in FIG. 1, the optical system is corrected for chromatic or spherical aberration, coma, flare, astigmatism and other optical defects.

Because of the projection arrangement, one may employ a highly compact T-V set having a relatively small tube such as a 10 or 12 inch size, so that the total cost of the system may be lower than that of a large size set.

While there have been shown and described preferred embodiments of an objective lens assembly system in accordance with the invention, it will be appreciated that many changes and modifications may be made therein without, however, departing from the essential spirit thereof as defined in the annexed claims.

We claim:

1. A high-speed objective lens assembly adapted to project the image appearing on the screen of a television display tube onto a remote screen, said assembly comprising at least five lens elements formed of transparent thermoplastic material having a high order of light permeability, wherein the first lens element is concave-convex, the second lens element is double convex, the third lens element is double concave, the fourth lens element is double convex, and the fifth lens element which is adjacent said screen is double concave, said assembly having a speed of at least f: 1.5, the air space between the fourth and fifth lens elements being more than twice as great as the air space between the third and fourth lens elements.

2. An objective lens assembly as set forth in claim 1 in which at least four of said lens elements are made of transparent acrylic.

3. An objective lens assembly as set forth in claim 1, in which at least one of said lens elements is made of transparent polystyrene.

4. An assembly as set forth in claim 2, wherein the second surface of the second lens element has a different radius of curvature from the first surface of the third lens element.

5. An objective lens assembly comprising six lens elements A, B, C, D, E and F, made and spaced substantially according to the following data:

|   | R |   |   | SPACES |   | $N_D$ | $V_D$ |
|---|---|---|---|---|---|---|---|
| A | $R_1$ | = | 8.741 | $T_1$ | = | 1.089 | 1.489 | 54.3 |
|   | $R_2$ | = | 50.81 | $S_1$ | = | .01 |   |   |
| B | $R_3$ | = | 6.204 | $T_2$ | = | 2.468 | 1.489 | 54.3 |
|   | $R_4$ | = | −16.34 | $S_2$ | = | .001 |   |   |
| C | $R_5$ | = | −17.75 | $T_3$ | = | .529 | 1.5917 | 30.8 |
|   | $R_6$ | = | 4.491 | $S_3$ | = | 1.489 |   |   |
| D | $R_7$ | = | 12.90 | $T_4$ | = | 1.458 | 1.489 | 54.3 |
|   | $R_8$ | = | −8.03 | $S_4$ | = | 7.724 |   |   |
| E | $R_9$ | = | −3.141 | $T_5$ | = | .5 | 1.489 | 54.3 |
|   | $R_{10}$ | = | 40.1 | $S_5$ | = | .1 |   |   |
| F | $R_{11}$ | = | 40. | $T_6$ | = | .3 | 1.507 | 46.9 |
|   | $R_{12}$ | = | 32.3 |   |   |   |   |   | wherein $R_1$ to $R_{12}$ are numerical values for the radii of curvature, $N_D$ is the numerical value for the index of refraction, and $V_D$ is the numerical value of the Abbe dispersion number.

6. An assembly as set forth in claim 5, wherein $R_1$, $R_6$ and $R_9$ are vertex radii of curvature, as these three surfaces are aspheric, and the shapes of these three surfaces are defined by the formula:

$$Z = C \cdot Y^2 / 1 + \sqrt{1-(K+1) \cdot C^2 \cdot Y^2} + dY^4 + eY^6 + fY^8 + gY^{10}$$

the numerical values for insertion into the above formula for calculating values of Z for each value of Y are found in the following tables for each of the surfaces $R_1$, $R_6$ and $R_9$:

|   | Surface $R_1$ | Surface $R_6$ | Surface $R^9$ |
|---|---|---|---|
| c | .1144 | .22268 | − .31835 |
| K | − .57011 | − .12298 × 10⁻¹ | − .15979 × 10 |
| d | − .39510 × 10⁻³ | − .41923 × 10⁻³ | .31413 × 10⁻² |
| e | − .56167 × 10⁻⁵ | − .16911 × 10⁻⁴ | − .67540 × 10⁻⁴ |
| f | .17766 × 10⁻⁶ | − .34771 × 10⁻⁵ | − .24771 × 10⁻⁵ |
| g | − .19389 × 10⁻⁷ | .19956 × 10⁻⁷ | .10339 × 10⁻⁶ |

\* \* \* \* \*

UNITED STATES PATENT OFFICE
CERTIFICATE OF CORRECTION

PATENT NO. : 3,868,173

DATED : February 25, 1975

INVENTOR(S) : John R. Miles and Grant M. Miles

It is certified that error appears in the above-identified patent and that said Letters Patent are hereby corrected as shown below:

In the Assignees "Ambatis" should have read -- Ambats --
Column 2, line 10 after "screen" -- be -- should have been inserted
Column 2, line 52 "fir" should have read -- for --
Column 3, line 16 "abovetype" should have read -- above type --
Column 4, line 12 "employes" should have read -- employs --
Column 4, line 40 "cathoderay" should have read -- cathode ray --
Column 4, line 52 "knoboperated" should have read -- knob operated --
Column 7, line 35 a period -- . -- should have been inserted after "20°)"
Column 7, line 36 the period " . " before Lenses should be deleted
Column 8, lines 51, 52, 53 and 54 "f: 1.5, the air space between the fourth and fifth lens elements being more than twice as great as the air space between the third and fourth lens elements." should have read -- f: 1.5, the ratio of the air space between the fourth and fifth lens elements and the air space between the third and fourth lens elements being approximately 7.724 to 1.849. --

Signed and Sealed this fifth Day of August 1975

[SEAL]

Attest:

RUTH C. MASON
Attesting Officer

C. MARSHALL DANN
Commissioner of Patents and Trademarks